Figure 15:
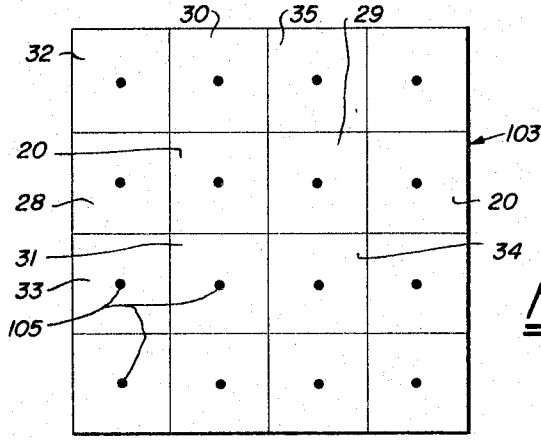

Aug. 2, 1966    J. G. JACKSON    3,263,561
HIGH LIGHT REFLECTING SCREENS
Filed May 13, 1963    4 Sheets-Sheet 1
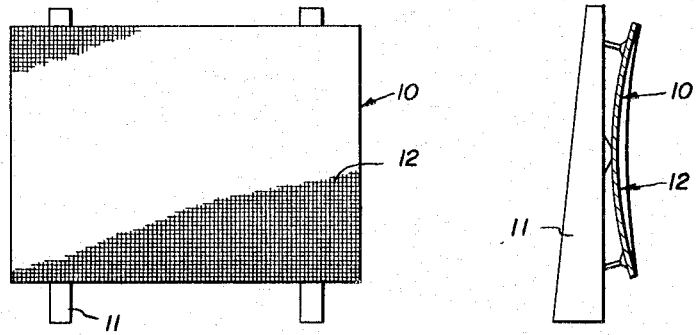
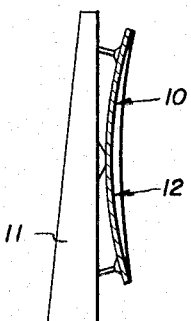
Fig.1.    Fig.2.
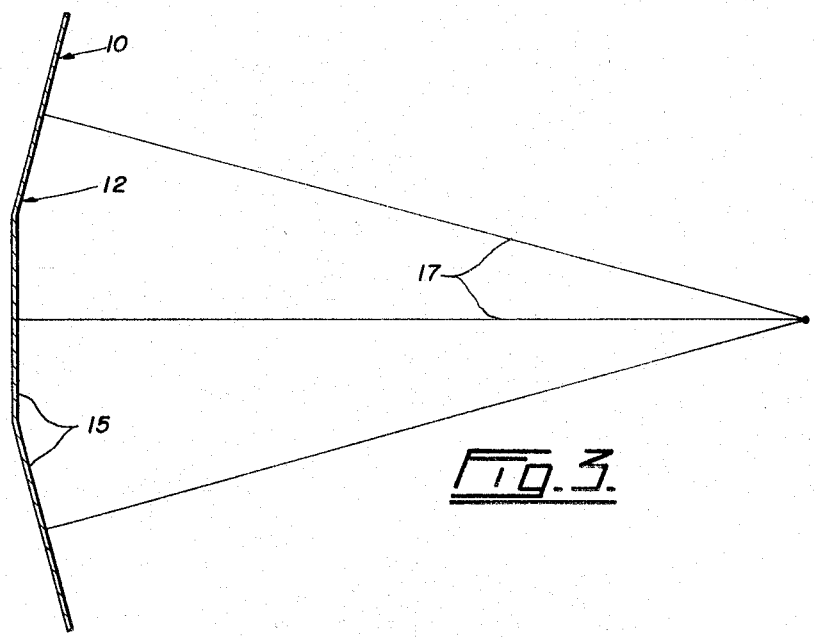
Fig.3.
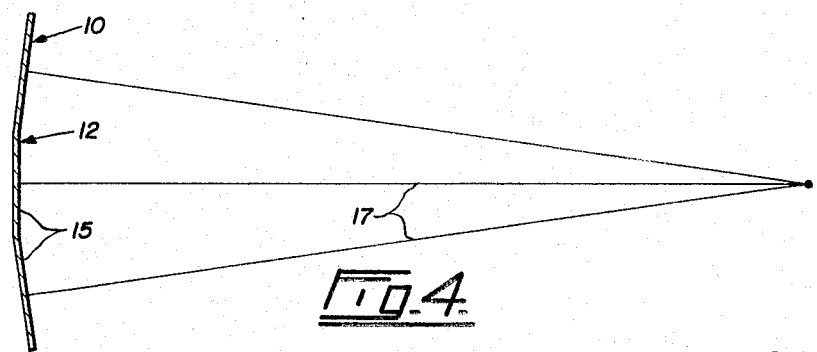
Fig.4.
INVENTOR
JAMES G. JACKSON
BY
Fetherstonhaugh & Co.
ATTORNEYS

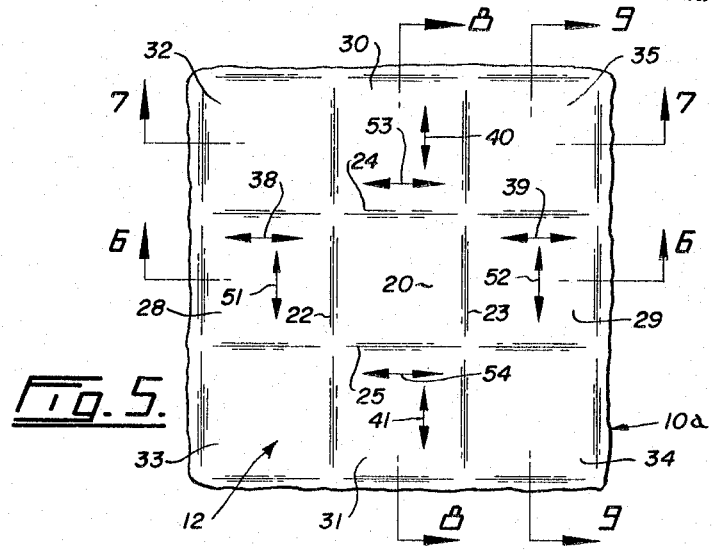
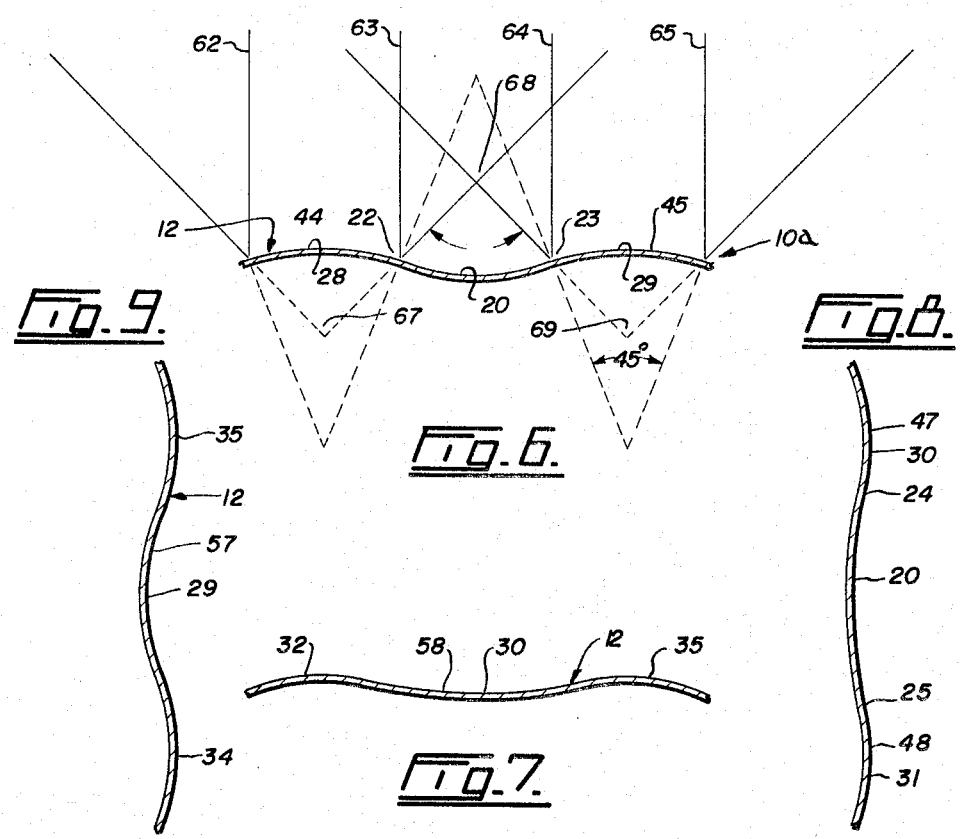

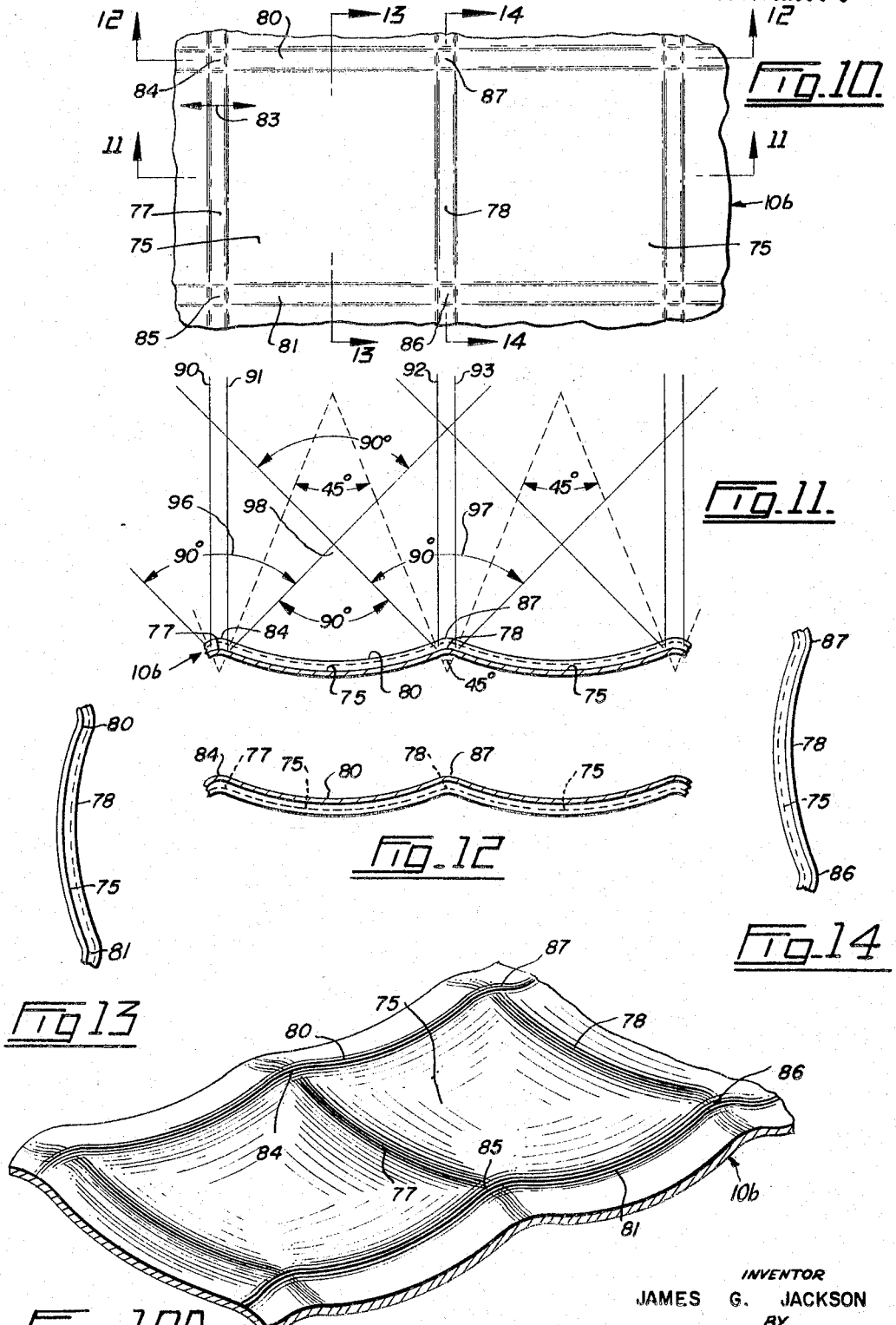

INVENTOR
JAMES G. JACKSON

United States Patent Office 3,263,561
Patented August 2, 1966

3,263,561
HIGH LIGHT REFLECTING SCREENS
James G. Jackson, Port Alberni, British Columbia, Canada, assignor to Solar Projection Screens Ltd., Vancouver, British Columbia, Canada
Filed May 13, 1963, Ser. No. 279,853
8 Claims. (Cl. 88—28.9)

This invention relates to screens which may be used as motion picture screens, advertising screens and the like.

An object of the present invention is the provision of screens adapted to concentrate light directed on to them by a projector and to reflect said light into a desired area, such as the audience areas of outdoor theatres.

Another object is the provision of screens on to which advertising material may be projected, said screens being such as to make the advertisement visible even in daylight.

Another object is the provision of an improved reflective surface for screens which may range anywhere from small display screens to large theatre and advertising screens.

The invention relates particularly to the individual reflectors and the arrangement of the reflectors which make up the reflecting surface of the screen.

A further object is the provision of light-reflecting screens made up of alternately positioned individual concave and convex reflectors of substantially rectangular shape arranged so that the boundaries thereof flow into each other without any flat or abrupt edges and with substantially no waste of reflecting surface, while producing a maximum number of glare spots from a light projector in a given area.

A light reflecting screen according to the present invention comprises a plurality of individual substantially rectangular main reflectors forming a reflecting surface therefor. Each main reflector is curved from four sides thereof towards its centre out of the general plane of the reflecting surface. The said curvatures from the sides toward the center may all be in a direction away from the viewer or may all be in a direction towards the viewer in which case the main reflector would present to the viewer a concave or a convex surface respectively. Although the curve may be uniform from the four sides inwardly of the reflector, it is preferable to make the transverse curve with a shorter radius than the vertical curve. Furthermore, the reflector may be square in shape, but it is preferably longer in the transverse direction than in the vertical direction. This main reflector is preferably concave relative to the reflecting surface, but as noted above it may be convex instead. Each main reflector has a side reflector at each of the four sides thereof. The side reflectors are curved (that is, concavely or convexly) opposite to the main reflector in a direction perpendicular to the side of the main reflector adjacent the side reflector and curved in the same way in the direction parallel to the side of the main reflector adjacent the side reflector. These directions will be referred to hereinafter as the "perpendicular" and "parallel" directions respectively. In other words, if the main reflector is concave, each of two opposite side reflectors is convexly curved in the perpendicular direction and concavely curved in the parallel direction. To aid in visualizing the side reflectors, a common riding saddle is an example of an object which is concave in one direction and convex in the other direction. The side reflectors are substantially the same shape as the main reflector but may be the same or a different size from the latter. Here again, it is preferable that the radius of the lateral curve of each side reflector be shorter than that of the vertical curve thereof. In the preferred form of the invention there is a substantially rectangular corner reflector at each of the four corners of the main reflectors, each of said corner reflectors being curved the same way in both directions, that direction opposite to the curve of the main reflector. In other words, if the main reflector is concave, each of the corner reflectors is convex, and vice versa.

The overall light reflecting screen is preferably concave relative to the reflecting surface thereof, and particularly relative large screens, although small screens may be substantially flat.

The curved reflectors of the screen are small enough to be beyond the visual resolving power of the eye at any point in the area from which the screen is to be viewed. The actual curve of the screen, and the positioning of the projector relative thereto does not form part of this invention. It is preferable to make the central axis of each panel of the screen generally coincide with a radius of the general curve of the screen. The image projected on to the screen is formed by a glare spot from each individual reflector, but when viewed at a distance, it appears as a solid image. The arrangement of the reflectors in the present screen is such that the main reflectors are interconnected in a way that makes it relatively easy to manufacture the screen while reflecting a very high percentage of the light back into the desired viewing area.

This invention is illustrated by way of example in the accompanying drawings, in which, FIGURE 1 is a diagrammatic front elevation of this light reflecting screen, FIGURE 2 is a diagrammatic vertical section through this screen, FIGURE 3 is an enlarged fragmentary horizontal section through the screen, illustrating one way of making the concave screen, FIGURE 4 is an enlarged vertical fragmentary section through the screen, FIGURE 5 is a very much enlarged front view of a plurality of individual reflectors, FIGURE 6 is a horizontal section taken on the line 6—6 of FIGURE 5, FIGURE 7 is a horizontal section taken on the line 7—7 of FIGURE 5, FIGURE 8 is a vertical section taken on the line 8—8 of FIGURE 5, FIGURE 9 is a vertical section taken on the line 9—9 of FIGURE 5.

Figure 16:
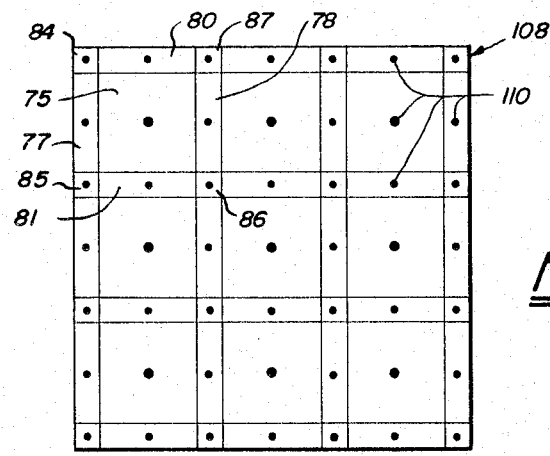
Figure 17:
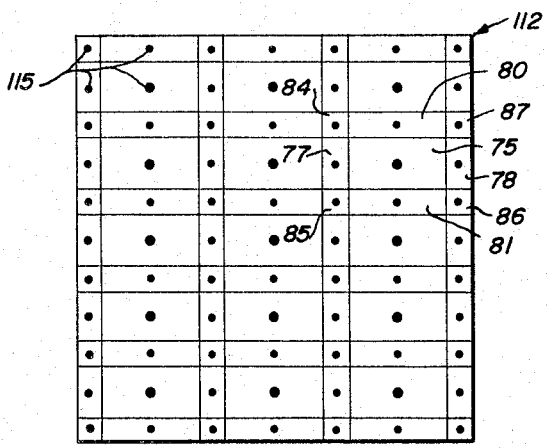

FIGURE 10 is an enlarged front elevation of a plurality of alternative individual reflectors, FIGURE 10A is a perspective view of the embodiment shown in FIGS. 10–14, FIGURES 11 to 14 are sections through the screen of FIGURE 10 taken on the lines 11—11, to 14—14 of said figure, FIGURE 15 diagrammatically illustrates a portion of a screen with a plurality of reflectors similar to those of FIGURE 5, showing glare spots resulting from light directed on to the screen by a projector, FIGURE 16 diagrammatically illustrates a screen portion the same size and on the same scale as that of FIGURE 15 with a plurality of reflectors similar to those of FIGURE 10, and FIGURE 17 diagrammatically illustrates a screen portion the same size and on the same scale as that of FIGURE 16, showing main reflectors the same width but not as high as the screen reflectors of FIGURE 16.

Referring to FIGURES 1 to 4 of the drawings, 10 represents a large reflecting screen incorporating the present invention supported in any suitable manner, such as by a suitable framework 11. This screen has a reflecting surface 12 which, in this example, is generally concave in shape.

As it is difficult to make a large screen of concave construction, screen 10 may be formed of a plurality of comparatively small panels 15, see FIGURES 3 and 4, which are angularly arranged relative to each other both vertically and laterally so that they form the generally concave reflecting surface 12. The normal 17 to the centre of each panel 15 preferably passes through the centre of the radius of the general curvature of the screen. In order not materially to affect the reflecting surface of the screen, these panels 15 are small relative to the size of the total screen.

FIGURES 5 to 9 illustrate a preferred form of screen 10a. The reflecting surface of this screen is made up of a plurality of individual reflectors which are small enough to be beyond the visual resolving power of the eye from the area from which the screen is to be viewed. Screen 10a comprises a plurality of sets of reflectors, each set including a substantially rectangular main reflector 20 defined by opposite sides or boundaries 22–23 and 24–25. Reflector 20 is curved from the four sides 22, 23, 24 and 25 thereof towards its centre out of the general plane of the reflecting surface of screen 10a. FIGS. 6 and 8 show that the said curvature, in this embodiment, is away from the said general plane, thereby presenting a concave surface to the viewer. It is preferable to make the curve between sides 22 and 23 of a shorter radius than that of the curve between sides 24 and 25, but for some purposes this may be altered. Side reflectors 28, 29, 30 and 31 are located respectively at the four sides of reflector 20. It is preferred in this form of the invention to provide corner reflectors 32, 33, 34 and 35 at the four corners of reflector 20.

Side reflectors 28, 29, 30 and 31 are curved (that is concavely or convexly) relative to the general plane of reflecting surface 12 opposite to the main reflector 20 in the direction perpendicular to the adjacent side of the main reflector as indicated by arrows 38, 39, 40 and 41, which will be referred to hereinafter as the perpendicular direction. For example, when the main reflector is concave, said side reflectors are convex in the perpendicular direction as shown at 44 and 45 in FIGURE 6 and at 47 and 48 in FIGURE 8. Reflectors 28, 29, 30 and 31 are curved the same way as the main reflector in a direction parallel to the adjacent side of the main reflector 20 as indicated by arrows 51, 52, 53 and 54. This will be referred to as the parallel direction. For example, when the main reflector is concave, the side reflectors are also concave in said parallel direction as indicated at 57 in FIGURE 9 and 58 in FIGURE 7. Only reflectors 29 and 30 are shown in FIGURES 9 and 7, respectively, but reflectors 28 and 31 are respectively exactly the same.

From FIGURES 6 to 9, it can be seen that the four edges or boundaries of main reflector 20 flow into the adjacent edges or boundaries of the side reflectors, and that edges or boundaries of the side reflectors curve or flow into adjacent edges or boundaries of the corner reflectors without any sharp or abrupt edges.

FIGURE 6 illustrates the manner in which light directed on to reflecting surface 12 is reflected by reflectors 20, 28 and 29. Rays of light 62–63, 63–64 and 64–65 strike the side edges of the reflectors and are reflected to form the reflection angles 67, 68 and 69. Rays 63 and 64 are common to reflectors 28–20 and 20–29, respectively. Thus, each reflector creates a glare spot that appears to be located centrally thereof.

FIGURES 10 to 14 illustrate an alternative reflecting screen 10b. This screen includes sets of reflectors, and each set comprises a substantially rectangular main reflector 75 having side reflectors 77, 78, 80 and 81 arranged around the four sides thereof. Corner reflectors 84, 85, 86 and 87 are provided at the corners of the main reflector. In this example, reflector 75 is exactly the same as reflector 20 of screen 10a, while side reflectors 77, 78, 80 and 81 are the same as side reflectors 28, 29, 30 and 31, respectively, of screen 10a, excepting that the side reflectors of screen 10b are considerably narrower in the said perpendicular direction as indicated by arrow 83, than said main reflector. In other words, screen 10b is the same as screen 10a, excepting that the side reflectors of the former have been compressed inwardly towards the main reflector. As a result of this, corner reflectors 84, 85, 86 and 87 are the same as corner reflectors 32, 33, 34 and 35, excepting that they are smaller both transversely and vertically than the latter. Each of the corner reflectors of screen 10b is substantially square and has sides, the lengths of which are equal to the widths of the side reflectors.

By referring to FIGURES 10A to 14, it will be seen that the concave curve of main reflector 75 flows smoothly into the convex curves of the side reflectors 77, 78, 80 and 81. Rays of light 90–91 and 91–92, and 92–93 strike the side edges of reflectors 77, 75 and 78, respectively. Rays 91 and 92 are common to the adjacent sides of reflectors 77–75 and 75–78. Rays 91 and 92 form a 90° reflection angle for reflector 75. Rays 90 and 91 form a 90° reflection angle 96 for convex reflector 77, while rays 92 and 93 form a 90° reflection angle 97 for convex reflector 78. Rays 91 and 92 form a 90° reflection angle 98 for concave reflector 75. Thus, all the reflectors reflect the light back into the same general area, but the reflection from center reflectors 77 and 78 is of less brilliancy than that from main reflector 75 because of their smaller areas. Each reflector creates a glare spot that appears to be located centrally thereof.

In screen 10b, the narrow side reflectors 77, 78, 80 and 81 actually join adjacent side edges or boundaries of two main reflectors 75. This, however, is done without any sharp corners, and yet the joining pieces or side reflectors themselves reflect light back into the same area as the main reflectors. Thus, no light is wasted at the joining pieces.

While main reflectors 20 and 75 have been described as being concave, they may be convex relative to the reflecting surface of the screen. In this case, the side reflectors are concave in the said perpendicular direction with respect to the main reflector, and are convex in the said parallel direction with respect to the main reflector. The relative curves of the side and corner reflectors may be seen in FIGURES 6 to 9 and 11 to 14 when the under side of each of the illustrated reflectors is considered to be the reflecting surface of the screen.

FIGURE 15 illustrates a portion 103 of a screen having a plurality of reflectors 20, 28, 29, 30, 31, 32, 33, 34 and 35 of FIGURE 5 therein. When light is directed on to the screen, each reflector produces a glare spot 105 centrally thereof. There are 16 such glare spots in FIGURE 15.

FIGURE 16 illustrates a portion 108 of a screen the same size and on the same scale as portion 103, and having a plurality of reflectors 75, 77, 78, 80, 81, 84, 85, 86 and 87 of FIGURE 10 therein. Each of these reflectors produces a glare spot 110 centrally thereof. The squeezing down of side reflectors 77, 78, 80 and 81 has not resulted in a loss of reflected light, but there are 49 glare spots in the same area as there are 16 glare spots in FIGURE 15.

FIGURE 17 illustrates a portion 112 of a screen the same size and on the same scale as portion 108, incorporating the reflectors of FIGURE 10 therein. The main reflectors 75 of screen portion 112 are the same width but narrower than main reflectors 75 of screen portion 108. Each reflector in portion 112 produces a glare spot 115 centrally thereof, and there are 77 of these glare spots in the same area as there are 49 spots in portion 108 and 16 spots in portion 103. The narrowing of the main reflectors does not result in a loss of reflected light in situations where the screen is substantially vertical and looked up at by people in a viewing area in front of it, as is usually the case with a moving picture screen.

When an image is projected on to a screen constructed according to this invention, the reflected image is composed of glare spots from the reflectors. The greater the number of reflectors in a given area, the better will be the reflected image. This is the same as the printing of a picture in a newspaper where the picture is composed of tiny dots. The smaller and the closer the dots are to each other, the better the resulting picture. Thus, the image reflected from the screen of FIGURE 16 would be clearer than that of FIGURE 15, and the image reflected by the screen of FIGURE 17 would be clearer than that from either of the screens of FIGURES 15 and 16.

What I claim as my invention is:

1. A light reflecting screen comprising a plurality of individual substantially rectangular main reflectors forming a reflecting surface for said screen, each of said main reflectors being curved from four sides thereof towards its centre out of the general plane of the reflecting surface, each of said main reflectors having a side reflector of similar shape at each of the four sides thereof, and each of said side reflectors being curved out of the said reflecting surface plane opposite to the main reflector in a direction perpendicular to the adjacent side of said main reflector and curved the same way as the main reflector in a direction parallel to said adjacent side of the main reflector, the curves of the main and side reflectors being such that the boundaries thereof flow into each other without flat or abrupt edges and with substantially no waste of reflecting surface, each said side reflector having a smaller radius of curvature than the main reflector in the said direction perpendicular to the adjacent side of the main reflector and a length substantially equal to the length of the said adjacent side of the main reflector.

2. A reflecting screen as claimed in claim 1 in which each main reflector is concave relative to the reflecting surface.

3. A reflecting screen as claimed in claim 1 in which each main reflector is convex relative to the reflecting surface.

4. A reflecting screen as claimed in claim 1 in which the entire screen is concave relative to the reflecting surface thereof.

5. A light reflecting screen comprising a plurality of individual substantially rectangular main reflectors forming a reflecting surface for said screen, each of said main reflectors being curved from four sides thereof towards its centre out of the general plane of the reflecting surface, each of said main reflectors having a side reflector of similar shape at each of the four sides thereof and a corner reflector at each of four corners thereof, each of said side reflectors being curved out of the said reflecting surface plane opposite to the main reflector in a direction perpendicular to the adjacent side of the said main reflector and curved the same way as the main reflector in a direction parallel to said adjacent side of the main reflector, and each of the corner reflectors being curved relative to the reflecting surface opposite to the curve of the main reflector, the curves of the main, side and corner reflectors being such that the boundaries thereof flow into each other without flat or abrupt edges and with substantially no waste of reflecting surface, each said side reflector having a smaller radius of curvature than the main reflector in the said direction perpendicular to the adjacent side of the main reflector, and each corner reflector being substantially square with the length of each side thereof being equal to the width of the said side reflectors.

6. A reflecting screen as claimed in claim 5 in which each main reflector is concave relative to the reflector surface.

7. A reflecting screen as claimed in claim 5 in which each main reflector is convex relative to the reflecting surface.

8. A reflecting screen as claimed in claim 5 in which the entire screen is concave relative to the reflecting surface thereof.

References Cited by the Examiner

UNITED STATES PATENTS

| | | | |
|---|---|---|---|
| 410,598 | 9/1889 | Koyl | 88—28.9 X |
| 1,122,192 | 12/1914 | Clark | 88—28.9 |
| 2,044,620 | 6/1936 | Matthai. | |
| 2,804,801 | 9/1957 | Mihalakis | 88—28.9 |
| 2,968,219 | 1/1961 | Saiia | 88—28.9 |

JULIA E. COINER, *Primary Examiner.*